US010062237B2

(12) United States Patent
Devine et al.

(10) Patent No.: US 10,062,237 B2
(45) Date of Patent: Aug. 28, 2018

(54) WHEEL DISPLAY APPARATUS WITH LINKED WEDGES

(71) Applicant: Bally Gaming, Inc., Las Vegas, NV (US)

(72) Inventors: Daniel Devine, Sparks, NV (US); Andrew Johanson, Reno, NV (US); Keshav Pitani, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 102 days.

(21) Appl. No.: 15/212,555

(22) Filed: Jul. 18, 2016

(65) Prior Publication Data

US 2018/0018851 A1 Jan. 18, 2018

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ...... *G07F 17/3211* (2013.01); *G07F 17/3209* (2013.01); *G07F 17/3246* (2013.01); *G07F 17/3248* (2013.01); *G07F 17/3251* (2013.01); *G07F 17/34* (2013.01)

(58) Field of Classification Search

None

See application file for complete search history.

(56) References Cited

U.S. PATENT DOCUMENTS

| | | | | |
|---|---|---|---|---|
| 4,711,452 | A | 12/1987 | Dickinson et al. | |
| 6,164,647 | A * | 12/2000 | Chee | A63F 5/00 273/142 F |
| 6,561,512 | B2 | 5/2003 | Luciano et al. | |
| 6,605,000 | B2 | 8/2003 | Adams | |
| 6,663,488 | B1 * | 12/2003 | Adams | G07F 17/32 463/17 |
| D486,869 | S | 2/2004 | Webb et al. | |
| 6,705,944 | B2 * | 3/2004 | Luciano | G07F 17/32 273/143 R |
| 6,827,646 | B2 | 12/2004 | Adams | |
| 6,855,052 | B2 | 2/2005 | Weiss et al. | |
| 6,875,106 | B2 | 4/2005 | Weiss et al. | |
| 7,021,624 | B2 | 4/2006 | Luciano et al. | |
| 7,179,169 | B2 | 2/2007 | Beaulieu et al. | |
| 7,198,570 | B2 | 4/2007 | Rodgers et al. | |
| RE39,659 | E | 5/2007 | Luciano et al. | |
| 7,216,867 | B1 | 5/2007 | Luciano et al. | |
| 7,278,635 | B2 | 10/2007 | Kelly et al. | |
| 7,354,342 | B2 | 4/2008 | Paulsen et al. | |
| 7,425,176 | B2 | 9/2008 | Nelson et al. | |
| 7,425,177 | B2 | 9/2008 | Rodgers et al. | |
| 7,431,649 | B2 | 10/2008 | Webb et al. | |

(Continued)

*Primary Examiner* — Paul A D'Agostino

(74) *Attorney, Agent, or Firm* — Michael Blankstein; Marvin A. Hein

(57) ABSTRACT

An apparatus comprises a wheel and an indicator. The wheel includes a plurality of wedges and a linking element. The plurality of wedges bear respective awards, and the linking element is configured to link a subset of at least two wedges of the plurality of wedges. The indicator is configured to designate a wedge within the plurality of wedges. In response to the designated wedge being within the subset, a combination of the awards associated with the at least two wedges of the plurality of wedges are awarded.

16 Claims, 8 Drawing Sheets

(56) References Cited

U.S. PATENT DOCUMENTS

| | | | |
|---|---|---|---|
| 7,540,806 B2 | 6/2009 | Tastad | |
| 7,597,618 B2 | 10/2009 | Webb et al. | |
| 7,625,278 B2 | 12/2009 | Paulsen et al. | |
| 7,674,172 B2 | 3/2010 | Miltenberger et al. | |
| 7,690,978 B2 | 4/2010 | Webb et al. | |
| 7,708,628 B2 * | 5/2010 | Baerlocher | G07F 17/34 463/16 |
| 7,731,581 B2 | 6/2010 | Chamberlain et al. | |
| 7,766,329 B1 | 8/2010 | Kelly et al. | |
| 7,775,869 B2 | 8/2010 | Pau et al. | |
| 7,775,870 B2 | 8/2010 | Kelly et al. | |
| 7,785,185 B2 | 8/2010 | Webb et al. | |
| 7,794,317 B2 | 9/2010 | Kaminkow et al. | |
| 7,819,741 B1 | 10/2010 | Luciano | |
| 7,823,883 B1 | 11/2010 | Kelly et al. | |
| 7,824,252 B1 | 11/2010 | Kelly et al. | |
| 7,832,727 B1 | 11/2010 | Kelly et al. | |
| 7,841,936 B2 | 11/2010 | Berman et al. | |
| 7,862,422 B2 | 1/2011 | Garamendi et al. | |
| 7,874,913 B2 | 1/2011 | Webb et al. | |
| 7,878,506 B1 | 2/2011 | Kelly et al. | |
| 7,922,175 B1 | 4/2011 | Kelly et al. | |
| 7,922,176 B1 | 4/2011 | Kelly et al. | |
| 7,976,022 B1 | 7/2011 | Kelly et al. | |
| 7,980,945 B2 | 7/2011 | Gatto et al. | |
| 8,006,977 B1 | 8/2011 | Kelly et al. | |
| 8,052,148 B1 | 11/2011 | Kelly et al. | |
| 8,096,554 B1 | 1/2012 | Kelly et al. | |
| 8,100,401 B1 | 1/2012 | Kelly et al. | |
| 8,100,754 B2 | 1/2012 | Bigelow, Jr. et al. | |
| 8,142,273 B2 | 3/2012 | Williams et al. | |
| 8,152,171 B2 | 4/2012 | Miltenberger et al. | |
| 8,197,326 B2 | 6/2012 | Chamberlain et al. | |
| 8,210,944 B2 | 7/2012 | Mead | |
| 8,216,046 B2 | 7/2012 | Ikeya et al. | |
| 8,241,105 B1 | 8/2012 | Luciano et al. | |
| 8,246,439 B2 | 8/2012 | Kelly et al. | |
| 8,246,445 B2 | 8/2012 | Rodgers et al. | |
| 8,246,452 B2 | 8/2012 | Vallejo et al. | |
| 8,267,767 B2 | 9/2012 | Kryuchkov et al. | |
| 8,287,355 B2 | 10/2012 | Bennett | |
| 8,303,395 B2 | 11/2012 | Pau et al. | |
| 8,371,935 B2 | 2/2013 | Vallejo et al. | |
| 8,388,436 B2 | 3/2013 | Rodgers et al. | |
| 8,414,381 B2 | 4/2013 | Hein et al. | |
| 8,425,316 B2 | 4/2013 | Silva et al. | |
| 8,449,372 B2 | 5/2013 | Glenn, II et al. | |
| 8,460,098 B2 | 6/2013 | Mead | |
| 8,491,374 B2 | 7/2013 | Bennett | |
| 8,523,672 B2 | 9/2013 | Kryuchkov et al. | |
| 8,535,141 B2 | 9/2013 | Rommerdahl et al. | |
| 8,535,148 B2 | 9/2013 | Vallejo et al. | |
| 8,597,103 B2 | 12/2013 | Bigelow, Jr. et al. | |
| 8,622,825 B2 | 1/2014 | Griswold et al. | |
| 8,628,395 B2 | 1/2014 | Pau et al. | |
| 8,641,507 B2 | 2/2014 | Kelly et al. | |
| 8,651,941 B2 | 2/2014 | Rodgers et al. | |
| 8,651,942 B2 | 2/2014 | Rodgers et al. | |
| 8,662,987 B2 | 3/2014 | Bennett et al. | |
| 8,747,211 B2 | 6/2014 | Vallejo et al. | |
| 8,771,051 B2 | 7/2014 | Mattice et al. | |
| 8,814,676 B2 | 8/2014 | De Courssou et al. | |
| 8,834,259 B2 | 9/2014 | Rommerdahl et al. | |
| 8,845,410 B2 | 9/2014 | Ikeya et al. | |
| 8,851,972 B2 | 10/2014 | Rodgers et al. | |
| 8,888,098 B2 | 11/2014 | Kogure et al. | |
| 8,900,049 B2 | 12/2014 | Bennett | |
| 8,956,216 B1 | 2/2015 | LeSourd et al. | |
| 8,956,217 B1 | 2/2015 | Brooks et al. | |
| 8,974,280 B2 | 3/2015 | LeSourd | |
| 8,979,636 B2 | 3/2015 | Brooks et al. | |
| 8,998,704 B2 | 4/2015 | LeSourd et al. | |
| 9,070,248 B2 | 6/2015 | Brooks et al. | |
| 9,135,774 B2 | 9/2015 | LeMay et al. | |
| 2004/0235557 A1 | 11/2004 | Adams | |
| 2007/0054723 A1 | 3/2007 | Mattice et al. | |
| 2007/0184895 A1 | 8/2007 | Adams | |
| 2007/0281780 A1 | 12/2007 | Aida | |
| 2008/0113727 A1 | 5/2008 | Vallejo et al. | |
| 2008/0113750 A1 | 5/2008 | Vallejo et al. | |
| 2008/0176625 A1 | 7/2008 | Kelly et al. | |
| 2008/0261684 A1 | 10/2008 | Vallejo et al. | |
| 2008/0300039 A9 | 12/2008 | Kelly et al. | |
| 2009/0005155 A1 | 1/2009 | Rodgers et al. | |
| 2009/0305771 A1 | 12/2009 | Webb et al. | |
| 2011/0059789 A1 | 3/2011 | Luciano | |
| 2013/0012317 A1 | 1/2013 | Kryuchkov et al. | |
| 2013/0225256 A1 * | 8/2013 | Shiraishi | G07F 17/326 463/17 |
| 2013/0237327 A1 | 9/2013 | LeMay et al. | |
| 2013/0260869 A1 * | 10/2013 | Basallo | G07F 17/3267 463/25 |
| 2014/0031104 A1 | 1/2014 | Bennett | |
| 2014/0128151 A1 | 5/2014 | Pau et al. | |
| 2015/0011296 A1 | 1/2015 | Rodgers et al. | |
| 2015/0080087 A1 | 3/2015 | Nicely et al. | |
| 2015/0087378 A1 | 3/2015 | Louie et al. | |
| 2016/0019748 A1 | 1/2016 | LeMay et al. | |
| 2016/0030831 A1 | 2/2016 | Stasson et al. | |
| 2016/0042591 A1 | 2/2016 | Bernard et al. | |
| 2016/0093133 A1 | 3/2016 | Kelly et al. | |
| 2016/0093139 A1 | 3/2016 | Zielinski et al. | |
| 2017/0365133 A1 * | 12/2017 | Lund | G07F 17/326 |

* cited by examiner

WHEEL DISPLAY APPARATUS WITH LINKED WEDGES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wheel display apparatus and, more particularly, to a wheel display apparatus with linked wedges.

BACKGROUND OF THE INVENTION

A wheel display apparatus for use in games and the like typically comprises a wheel and a pointer. The wheel may be mechanical or rendered on a video screen. The wheel is divided into a plurality of wedges bearing respective awards such as credit values, currency amounts, bonus features, number of free plays of another game segment, etc. For example, a 360 degree wheel may be divided into twelve equally sized wedges with each wedge spanning 30 degrees. To determine an outcome, the pointer may be stationary and aimed at a 12 o'clock position of the wheel as the wheel is spun about its central axis and stopped. The stationary pointer designates a wedge that lands at the 12 o'clock position. Alternatively, the wheel may be stationary as the pointer is spun about the central axis of the wheel and stopped to designate a wedge. The game provides the award associated with the designated wedge.

If the wheel display apparatus is incorporated into a regulated electronic gaming machine such as a slot machine, the game is executed by game-logic circuitry. Using a random outcome generator such as a random number generator (RNG), the game-logic circuitry determines the outcome of the wheel spin prior to spinning the wheel and then spins the wheel to the predetermined outcome. Some games permit multiple spins of the wheel to yield multiple awards. Such multiple spins, however, require the game-logic circuitry to operate the random outcome generator multiple times to generate multiple random outcomes and to successively spin the wheel to each predetermined outcome, thereby increasing usage of processing and/or memory resources. As the game industry matures, the creativity and ingenuity required to improve the operation of apparatus used in games grows accordingly.

SUMMARY OF THE INVENTION

According to one aspect of the present invention, an apparatus comprises a wheel and an indicator. The wheel includes a plurality of wedges and a linking element. The plurality of wedges bear respective awards, and the linking element is configured to link a subset of at least two wedges of the plurality of wedges. The indicator is configured to designate a wedge within the plurality of wedges. In response to the designated wedge being within the subset, a combination of the awards associated with the at least two wedges of the plurality of wedges are awarded.

Additional aspects of the invention will be apparent to those of ordinary skill in the art in view of the detailed description of various embodiments, which is made with reference to the drawings, a brief description of which is provided below.

Figure 1:
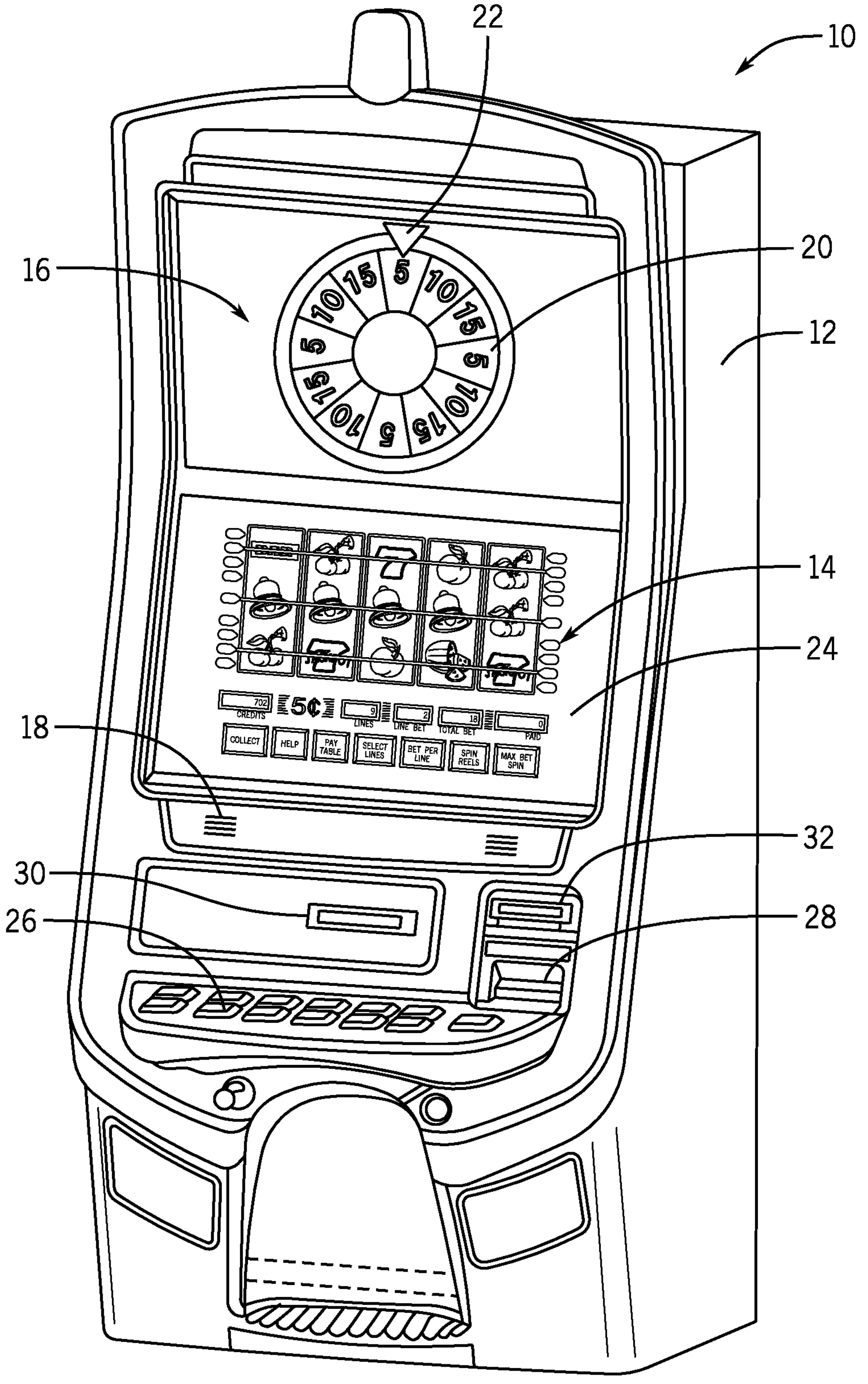
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally; or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaining machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc.

The gaming machine 10 illustrated in FIG. 1 comprises a gaming cabinet 12 that securely houses various input devices, output devices, input/output devices, internal electronic/electromechanical components, and wiring. By way of example, the output devices include a primary display apparatus 14, a wheel display apparatus 16, and one or more audio speakers 18. The primary display apparatus 14 may be a plurality of electromechanical reels, a video display device, or a combination thereof in which a transmissive video display is disposed in front of the mechanical reels to portray a video image superimposed upon the reels. The primary display apparatus 14 variously displays information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The wheel display apparatus 16 includes a wheel 20 and an indicator 22 such as a pointer. The wheel 20 and/or the indicator 22 may be physical or rendered on a video screen. If physical, the wheel 20 or the indicator 22 may rotate with a motor-driven axial shaft to which the wheel or indicator is connected.

The gaming machine 10 includes a touch screen(s) 24 mounted over the primary display apparatus 14, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts. The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
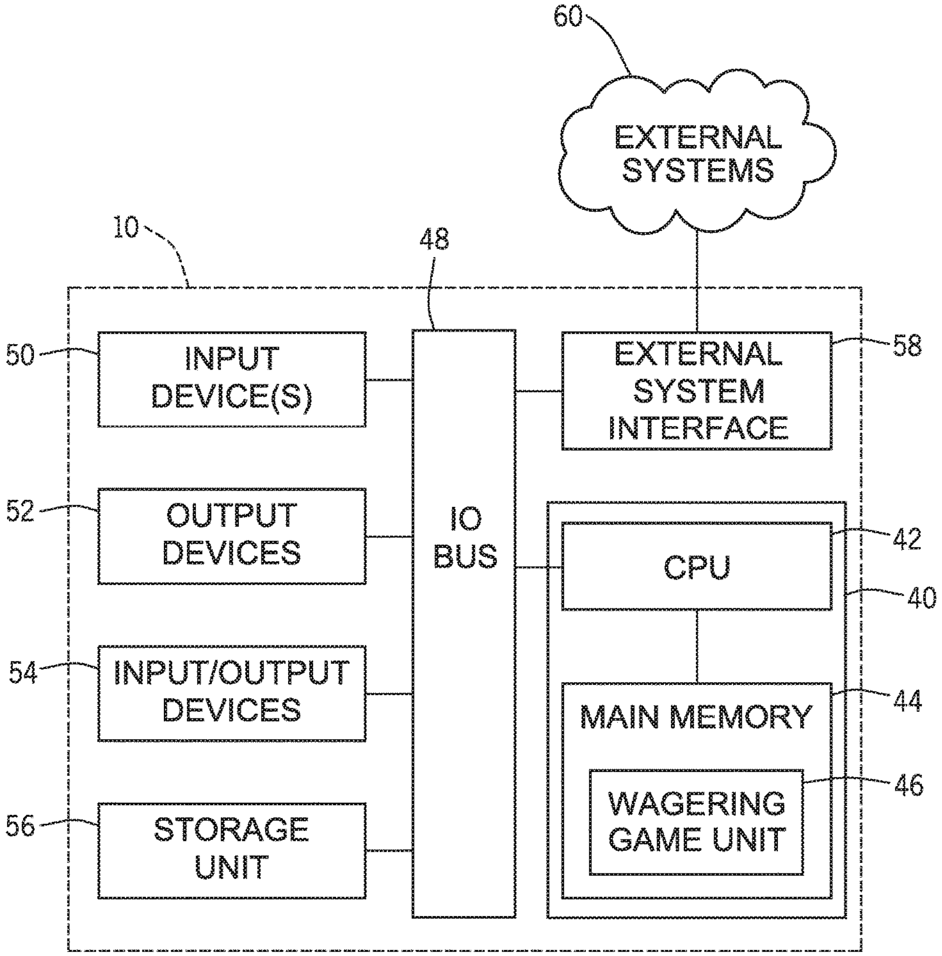
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1.

The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
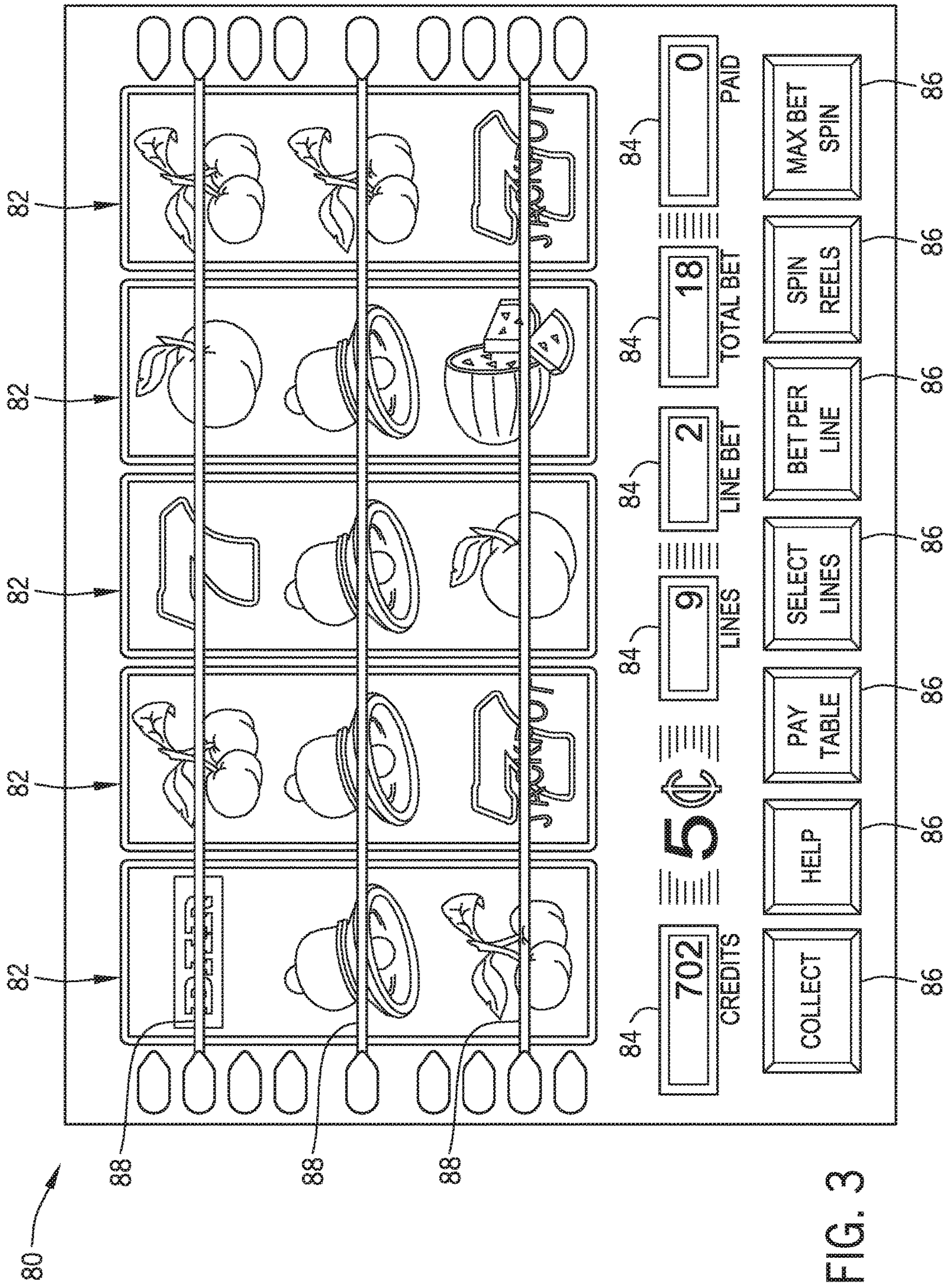
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display apparatus 14. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display apparatus 14 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array. A bonus feature may, for example, may be displayed on the wheel display apparatus 16 in FIG. 1.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display apparatus 14) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display apparatus 14, other display device, or other output device (e.g., speakers, lights, communication device, to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

As stated above, the basic game may trigger a bonus feature displayed on the wheel display apparatus 16 in FIG. 1. In accordance with the embodiments illustrated in FIGS. 4-8, the wheel display apparatus includes a wheel 20 and an indicator 22. The indicator 22 may be stationary and aimed at a 12 o'clock position of the wheel 20. The wheel 20 includes a plurality of wedges 90 and one or more linking elements 92. For example, the 360 degree wheel 20 may be divided into twelve equally sized wedges 90 with each wedge spanning 30 degrees. The plurality of wedges 90 bear respective awards 94 such as credit values, currency amounts, progressive jackpots, multipliers, merchandise, bonus features, number of free plays of the basic game, etc.

Each linking element 92 is configured to link a subset of at least two wedges of the plurality of wedges 90. The linking element 92 may be configured to require the wedges 90 in the subset to be adjacent to each other as illustrated in FIGS. 4-7 or to permit the wedges 90 in the subset to be separated from each other as illustrated in FIG. 8. In one embodiment, the wedges 90 in the subsets linked by different linking elements 92 are mutually exclusive, i.e., do not overlap, such that the subset of wedges 90 linked by one linking element 92 do not appear in any wedge subsets linked by other linking elements 92. The game-logic circuitry may be configured to randomly select each subset of wedges 90 linked by a respective "dynamic" linking element 92. This random selection of wedge subsets may occur over the course of multiple plays of the basic game, during the play of the basic game that triggers the bonus feature, at the commencement of the wheel bonus feature, and/or during other bonus features. The random selection may occur in response to triggering symbols, e.g., linking symbols, appearing in the basic game or another bonus feature, or may occur in response to a mystery trigger unrelated to symbols appearing in the game.

The game-logic circuitry is configured to spin the wheel 20 about its central axis and stop it such that the indicator 22 designates a wedge 90 that lands at the 12 o'clock position, and at least provide the award 94 associated with the designated wedge 90. In response to the designated wedge 90 being in a subset of wedges linked by a linking element 92, the game-logic circuitry is configured to combine the award directly designated by the indicator 22 with the awards 94 associated with the one or more other wedges 90 in the subset. The combination of awards 94 associated with the wedges 90 in the subset may, for example, be a multiplication of the awards 94 or a summation of the awards 94. The wheel 20 preferably resets to include no linking elements or a base formation of one or more linking elements 92 at the conclusion of the wheel bonus feature. In an alternative embodiment, instead of spinning the wheel 20, the wheel 20 may be stationary as the indicator 22 is spun about the central axis of the wheel 20 and stopped to designate a wedge 90.

Figure 4A:
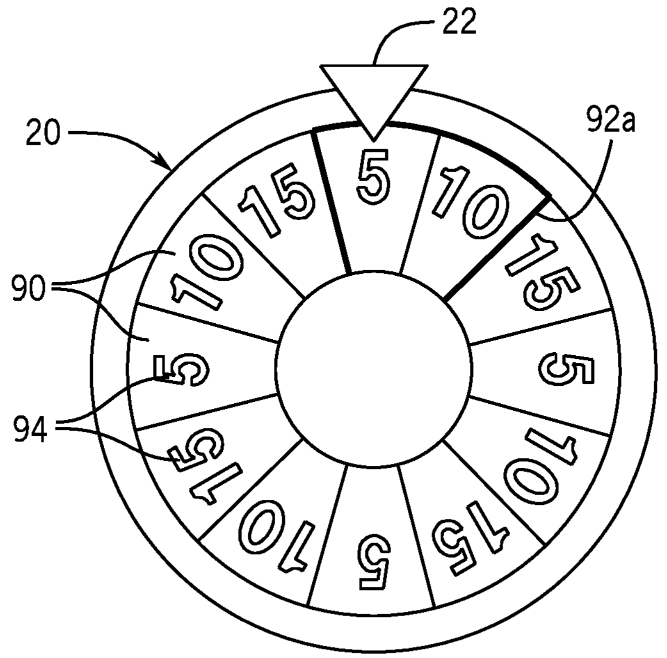
FIGS. 4A-B are images of a wheel with linking element according to a first embodiment of the present invention.
Figure 4B:
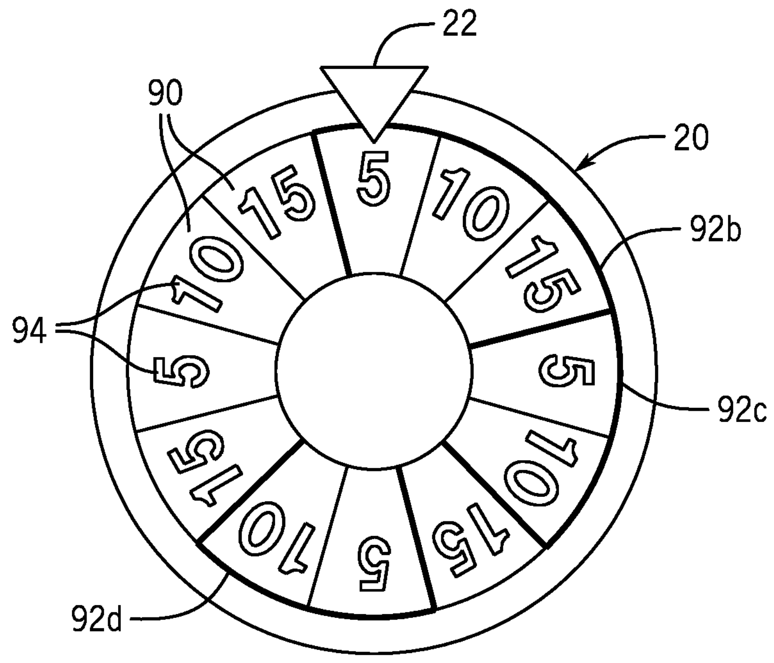

In the embodiment illustrated in FIGS. 4A-B, the linking element 92 is a frame around the subset of wedges. FIG. 4A illustrates a frame 92*a* around a subset of two wedges 90. In response to the wheel 20 spinning and stopping with the indicator 22 pointing at a wedge 90 within the frame 92*a* as shown in FIG. 4A, the game-logic circuitry is configured to provide a combination (e.g., summation or multiplication) of the 5 and 10 credit awards associated with the two wedges 90 within the frame 92*a*. FIG. 4B illustrates a first frame 92*b* around a subset of three wedges 90, a second frame 92*c* around a subset of two wedges 90, and a third frame 92*d* around a subset of two wedges 90. The frames 92*b-c* may have different colors to help distinguish between them. The wedges 90 in each subset may bear the same color as the surrounding frame to emphasize the frame to which the wedges are linked. In response to the wheel 20 spinning and stopping with the indicator 22 pointing at a wedge 90 within the frame 92*b* as shown in FIG. 4B, the game-logic circuitry is configured to provide a combination (e.g., summation or multiplication) of the 5, 10, and 15 credit awards associated with the three wedges 90 within the frame 92*b*.

Figure 5A:
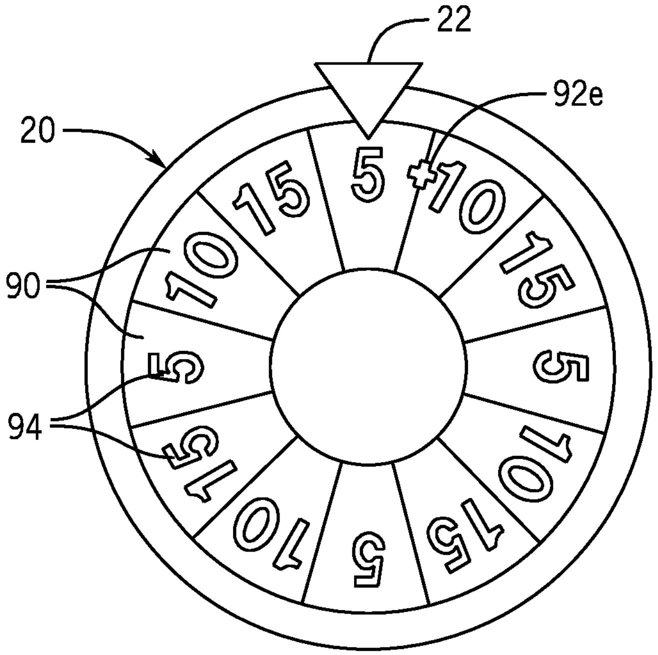
FIGS. 5A-B are images of a wheel with linking element according to a second embodiment of the present invention.
Figure 5B:
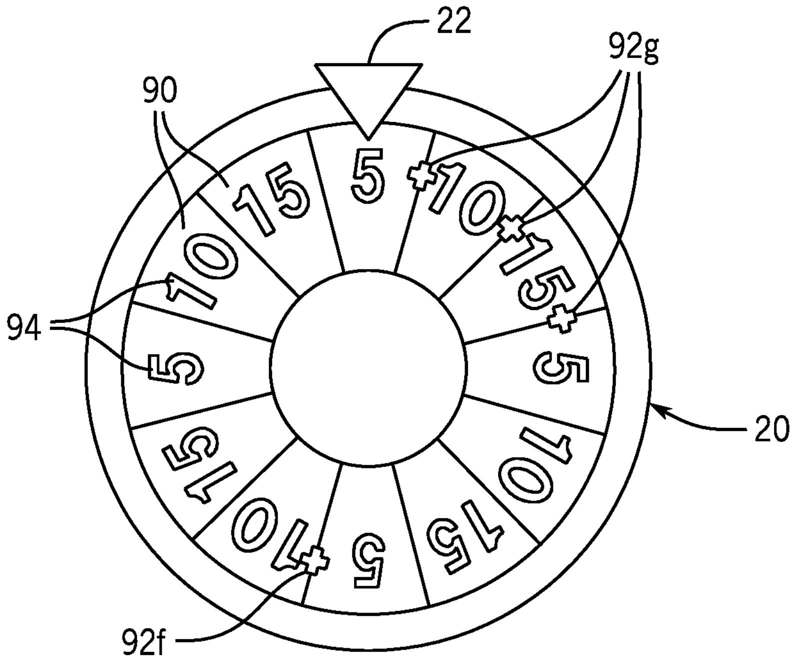

In the embodiment illustrated in FIGS. 5A-B, the linking element 92 is a connector between each adjacent pair of wedges 90 in a subset. The connector may be a mathematical symbol, such as a plus (+) or multiplication (×) symbol, indicating how the awards associated with the linked wedges are combined. The wedges 90 in each subset may bear a common color distinguishable from wedges outside the subset to help distinguish the subsets from each other and from wedges outside the subset. FIG. 5A illustrates a connector 92*e* between an adjacent pair of wedges 90 in a subset of two wedges 90. In response to the wheel 20 spinning and stopping with the indicator 22 pointing at one of the two wedges 90 linked by the connector 92*e* as shown in FIG. 5A, the game-logic circuitry is configured to provide a combination (e.g., summation or multiplication) of the 5 and 10 credit awards associated with the two wedges 90 linked by the connector 92*e*. The illustrated connector 92*e* is a plus (+) symbol and, therefore, the combination of the 5 and 10 credits awards is 15 credits. FIG. 5B illustrates a first connector 92*f* between an adjacent pair of wedges 90 in a subset of two wedges 90 and three second connectors 92*g* between adjacent pairs of wedges 90 in a subset of four wedges 90. In response to the wheel 20 spinning and stopping with the indicator 22 pointing at one of the four wedges 90 linked by the second connectors 92*g* as shown in FIG. 5B, the game-logic circuitry is configured to provide a combination (e.g., summation or multiplication) of the 5, 10, 15, and 15 credit awards associated with the four wedges 90 linked by the second connectors 92*g*. The illustrated connector 92*g* is a plus (±) symbol and, therefore, the combination of the 5, 10, 15, and 5 credits awards is 35 credits.

Figure 6A:
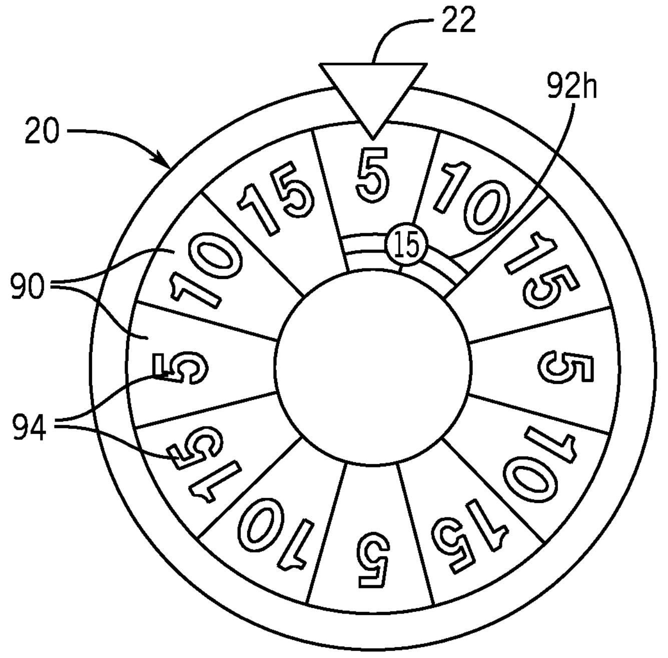
FIGS. 6A-B are images of a wheel with linking element according to a third embodiment of the present invention.
Figure 6B:
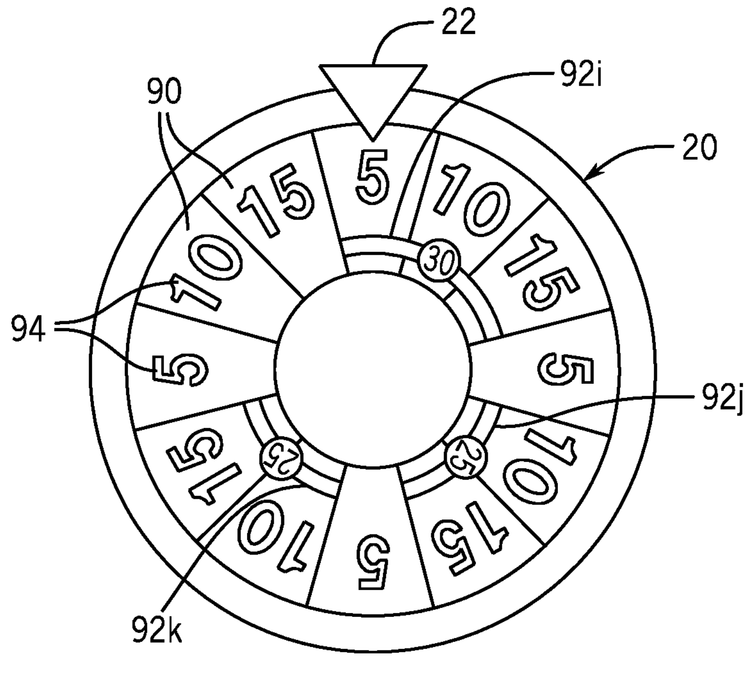

In the embodiment illustrated in FIGS. 6A-B, the linking element 92 is a band extending over the subset of wedges and preferably bearing the combination (e.g., summation or multiplication) of awards. FIG. 6A illustrates a band 92*h* extending over a subset of two wedges 90 and bearing 15 credits to reflect the summation of the 5 and 10 credit awards associated with the two wedges 90. In response to the wheel 20 spinning and stopping with the indicator 22 pointing at a wedge 90 under the band 92*h* as shown in FIG. 6A, the game-logic circuitry is configured to provide a combination (e.g., summation or multiplication) of the 5 and 10 credit awards associated with the two wedges 90 under the band 92*h*, which in this case is indicated by the band 92*h* to be 15 credits. FIG. 6B illustrates (i) a first band 92*i* extending over a subset of three wedges 90 and bearing 30 credits to reflect the summation of the 5, 10, and 15 credit awards associated with the three wedges 90, (ii) a second band 92*j* extending over a subset of two wedges 90 and bearing 2.5 credits to reflect the summation of the 10 and 15 credit awards associated with the two wedges 90, and (iii) a third band 92*k* extending over a subset of two wedges 90 and bearing 25 credits to reflect the summation of the 10 and 15 credit awards associated with the two wedges 90. The bands 92*i-k* may have different colors to help distinguish between them. The wedges 90 in each subset may bear the same color as the overlying band to emphasize the band to which the wedges are linked. In response to the wheel 20 spinning and stopping with the indicator 22 pointing at a wedge 90 under the band 92*i* as shown in FIG. 6B, the game-logic circuitry is configured to provide a combination (e.g., summation or multiplication) of the 5, 10, and 15 credit awards associated with the three wedges 90 under the band 92*i*, which in this case is indicated by the band 92*i* to be 30 credits.

Figure 7A:
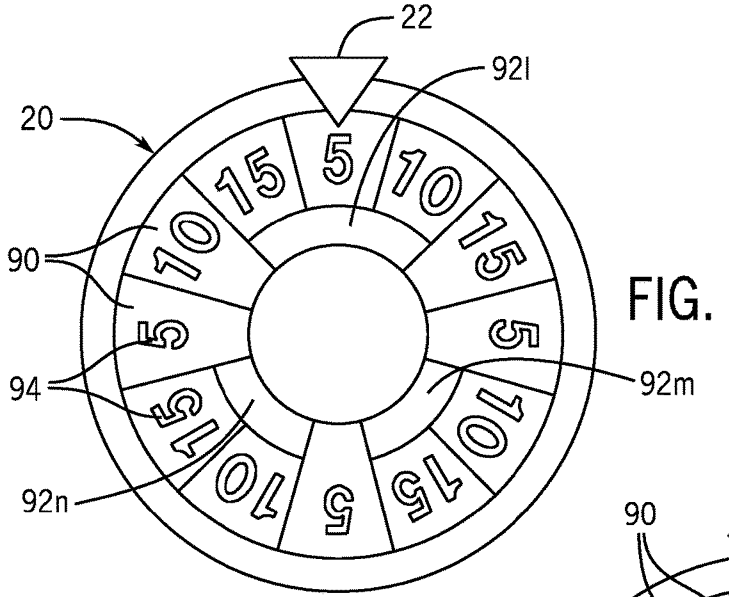
FIGS. 7A-C are images of a wheel with linking element according to a fourth embodiment of the present invention.
Figure 7B:
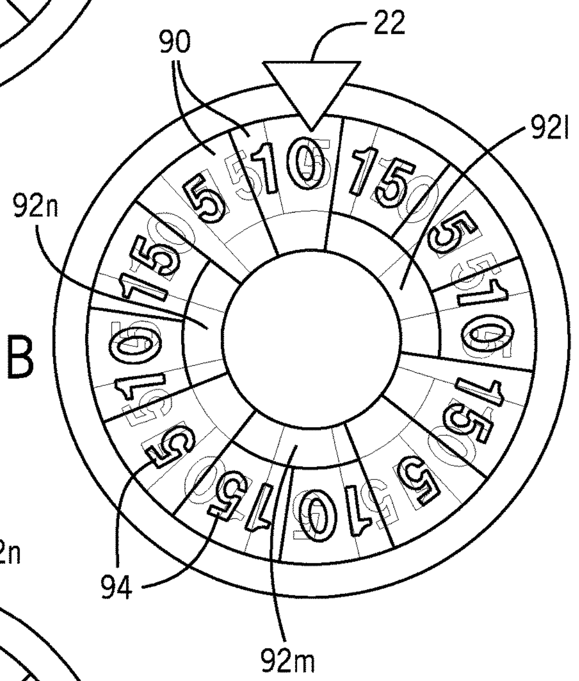
Figure 7C:
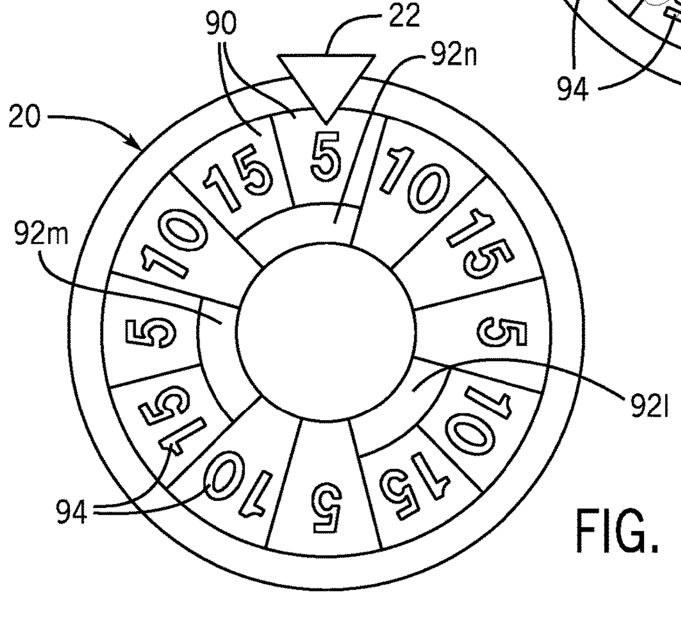

In the embodiment illustrated in FIGS. 7A-C, the plurality of wedges 90 of the wheel 20 are borne by a first wheel layer and the linking element 92 is borne by a second "spotlight" wheel layer that spins independently of the first wheel layer. The linking element 92 is a spotlight or band extending over the subset of wedges. The spotlight wheel layer may be substantially transparent except for the translucent or opaque spotlight. FIG. 7A illustrates (i) a first spotlight 92*l* extending over a subset of three wedges 90, (ii) a second spotlight 92*m* extending over a subset of two wedges 90, and (iii) a third spotlight 92.*n* extending over a subset of two wedges 90. The spotlights 92*l-n* may have different colors to help distinguish between them. The wedges 90 in each subset may bear the same color as the overlying spotlight to emphasize the spotlight to which the wedges are linked. In response to the first and second wheel layers of the wheel 20 spinning as shown in FIG. 7B and then stopping as shown in FIG. 7C with the indicator 22 pointing at a wedge 90 under the spotlight 92*n*, the game-logic circuitry is configured to provide a combination (e.g., summation or multiplication) of the 5 and 15 credit awards associated with the two wedges 90 under the spotlight 92*n*.

Figure 8A:
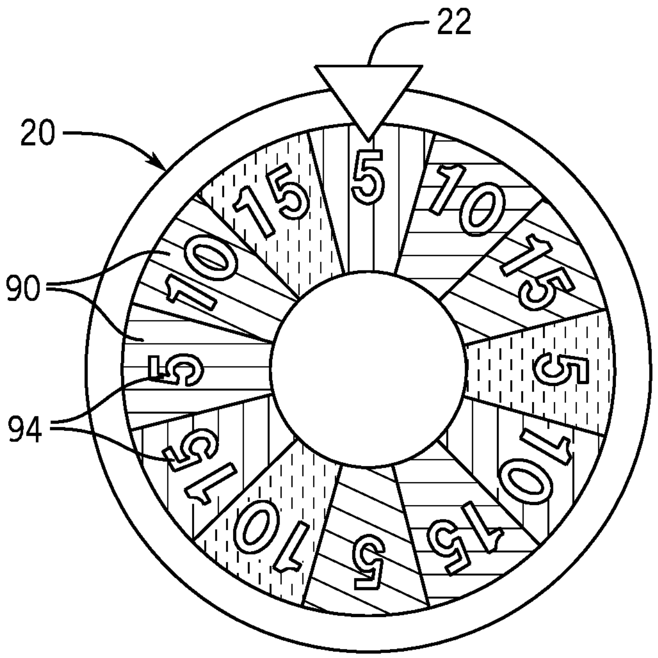
FIGS. 8A-B are images of a wheel with linking element according to a fifth embodiment of the present invention.
Figure 8B:
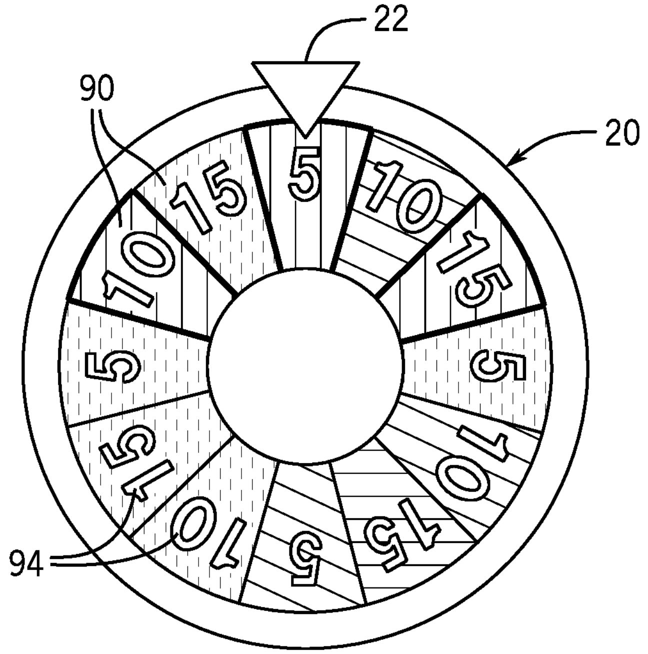

In the embodiment illustrated in FIGS. 8A-B, the linking element 92 is a common color applied to the subset of wedges 90 regardless of whether the wedges 90 in the subset are adjacent to each other. FIG. 8A illustrates (i) a first color initially applied three wedges 90 bearing 5, 10, and 15 credit award amounts, (ii) a second color initially applied to three wedges 90 bearing 5, 10, and 15 credit award amounts, (iii) a third color initially applied to three wedges 90 bearing 5, 10, and 15 credit award amounts, and (iv) a fourth color initially applied to three wedges 90 bearing 5, 10, and 15 credit award amounts. As the basic game or other bonus features are played and/or optionally at the commencement of the wheel bonus feature, the game-logic circuitry is configured to randomly change the colors of the wedges 90 to, for example, have an uneven distribution of colors among the wedges 90. In response to the wheel 20 spinning and stopping with the indicator 22 pointing at a wedge 90, the game-logic circuitry is configured to provide a combination (e.g., summation or multiplication) of the credit awards associated with the designated wedge (e.g., 5 credits in FIG. 8B) and any other wedges 90 (e.g., 10 and 15 credit wedges) bearing the same color as the designated wedge.

If the wheel display apparatus is incorporated into a regulated electronic gaming machine such as a slot machine, the game is executed by game-logic circuitry as described above. Using a random outcome generator such as a RNG, the game-logic circuitry determines the outcome of the wheel spin prior to spinning the wheel 20 and then spins the wheel 20 to the predetermined outcome. A technical advantage of the present invention is that the game-logic circuitry need only operate the random outcome generator a single time to generate multiple awards from the wheel 20, thereby minimizing usage of processing and/or memory resources of the gaming machine. A spin of the wheel 20 yields an award associated with the wedge 90 designated by the indicator 20, in combination with the awards associated with any wedges 90 linked to the designated wedge 90 by a linking element 92.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. An apparatus comprising:

a single wheel including both a plurality of circumferentially adjacent wedges and a linking element, the plurality of wedges bearing respective awards, the linking element configured to link a subset of at least two wedges of the plurality of circumferentially adjacent wedges, wherein the linking element is at least one of a frame around the subset, a connector between each adjacent pair of wedges in the subset, or a band extending over the at least two wedges in the subset; and an indicator configured to designate a wedge within the plurality of circumferentially adjacent wedges, wherein in response to the designated wedge being within the subset, a combination of the awards associated with the at least two wedges of the plurality of wedges are awarded.

2. The apparatus of claim 1, wherein the connector is a mathematical symbol indicating how the awards in the combination are combined.

3. The apparatus of claim 1, wherein the band bears the combination of the awards.

4. The apparatus of claim 1, wherein the plurality of circumferentially adjacent wedges are borne by a first wheel layer and the linking element is borne by a second wheel layer that spins independently of the first wheel layer.

5. The apparatus of claim 1, wherein the linking element includes a common color applied to the at least two wedges in the subset.

6. The apparatus of claim 1, wherein the subset of the at least two wedges of the plurality of circumferentially adjacent wedges is randomly selected.

7. The apparatus of claim 1, wherein the combination is selected from a group consisting of a multiplication of the awards and a summation of the awards.

8. The apparatus of claim 1, further including a second linking element configured to link a second subset of at least two wedges of the plurality of circumferentially adjacent wedges, the at least two wedges in the second subset and the at least two wedges in the subset being mutually exclusive.

9. An apparatus comprising:

a single wheel including both a plurality of circumferentially adjacent wedges and a linking element, the plurality of wedges bearing respective awards, the linking element configured to link a subset of at least two wedges of the plurality of circumferentially adjacent wedges, wherein the linking element is at least one of a frame around the subset, a connector between each adjacent pair of wedges in the subset, or a band extending over the at least two wedges in the subset;

an indicator; and game-logic circuitry configured to spin and stop the wheel such that the indicator designates a wedge within the plurality of circumferentially adjacent wedges, and in response to the designated wedge being within the subset, award a combination of the awards associated with the at least two wedges of the plurality of circumferentially adjacent wedges.

10. The apparatus of claim 9, wherein the connector is a mathematical symbol indicating how the awards in the combination are combined.

11. The apparatus of claim 9, wherein the band bears the combination of the awards.

12. The apparatus of claim 9, wherein the plurality of circumferentially adjacent wedges are borne by a first wheel layer and the linking element is borne by a second wheel layer that spins independently of the first wheel layer.

13. The apparatus of claim 9, wherein the linking element includes a common color applied to the at least two wedges in the subset.

14. The apparatus of claim 9, wherein the game-logic circuitry is configured to randomly select the subset of the at least two wedges of the plurality of circumferentially adjacent wedges which are linked by the linking element.

15. The apparatus of claim 9, wherein the combination is selected from a group consisting of a multiplication of the awards and a summation of the awards.

16. The apparatus of claim 9, further including a second linking element configured to link a second subset of at least two wedges of the plurality of circumferentially adjacent wedges, the at least two wedges in the second subset and the at least two wedges in the subset being mutually exclusive.

* * * * *